(12) United States Patent
Sivavakeesar

(10) Patent No.: US 11,102,847 B2
(45) Date of Patent: Aug. 24, 2021

(54) INTERFACE SETUP BETWEEN CELLULAR COMMUNICATION SYSTEM AND WLAN

(71) Applicant: NEC CORPORATION, Tokyo (JP)

(72) Inventor: Sivapathalingham Sivavakeesar, Milton Keynes (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/773,236

(22) PCT Filed: Nov. 1, 2016

(86) PCT No.: PCT/JP2016/004787
§ 371 (c)(1),
(2) Date: May 3, 2018

(87) PCT Pub. No.: WO2017/077706
PCT Pub. Date: May 11, 2017

(65) Prior Publication Data
US 2018/0324899 A1 Nov. 8, 2018

(30) Foreign Application Priority Data
Nov. 6, 2015 (GB) ...................................... 1519682

(51) Int. Cl.
*H04W 92/02* (2009.01)
*H04W 76/16* (2018.01)
(Continued)

(52) U.S. Cl.
CPC ............. *H04W 92/02* (2013.01); *H04W 8/22* (2013.01); *H04W 48/08* (2013.01); *H04W 48/16* (2013.01);
(Continued)

(58) Field of Classification Search
None
See application file for complete search history.

(56) References Cited

U.S. PATENT DOCUMENTS

2010/0112980 A1   5/2010   Horn et al.
2010/0265827 A1*  10/2010  Horn ..................... H04W 72/10
                                                        370/241
(Continued)

FOREIGN PATENT DOCUMENTS

JP   2015-136134 A   7/2015
WO   2014/110777 A1  7/2014
(Continued)

OTHER PUBLICATIONS

Ahmed et al., "Dynamic Resource Allocation in Hybrid Access Femtocell Network", The Scientific World Journal, vol. 2014, Mar. 20, 2014. (Year: 2014).*

(Continued)

*Primary Examiner* — Faruk Hamza
*Assistant Examiner* — Cassandra L Decker
(74) *Attorney, Agent, or Firm* — Sughrue Mion, PLLC

(57) ABSTRACT

Communication apparatus for a cellular communication system are disclosed. The communication apparatus comprises a controller and a transceiver. The controller is operable to control the transceiver to communicate with communication apparatus of a wireless local area network (WLAN) in pursuance of an interface setup procedure to setup an interface between the communication apparatus for the cellular communication system and the communication apparatus of the WLAN. As part of the interface setup procedure, the controller controls the transceiver to transmit an interface setup request message to the communication apparatus of the WLAN and receive, responsive to the interface setup request message, an interface setup response message including information identifying an access mode of at least one access point (AP) of the WLAN. The controller sets up the interface at the communication appa-
(Continued)

ratus for the cellular communication system based on the interface setup procedure.

14 Claims, 10 Drawing Sheets

(51) Int. Cl.
| | |
|---|---|
| *H04W 8/22* | (2009.01) |
| *H04W 48/08* | (2009.01) |
| *H04W 48/16* | (2009.01) |
| *H04W 88/16* | (2009.01) |
| *H04W 88/08* | (2009.01) |
| *H04W 84/04* | (2009.01) |
| *H04W 84/12* | (2009.01) |

(52) U.S. Cl.
CPC .......... *H04W 76/16* (2018.02); *H04W 88/16* (2013.01); *H04W 84/042* (2013.01); *H04W 84/12* (2013.01); *H04W 88/08* (2013.01)

(56) References Cited

U.S. PATENT DOCUMENTS

| | | | |
|---|---|---|---|
| 2011/0269464 A1 | 11/2011 | Xu et al. | |
| 2013/0324170 A1* | 12/2013 | Watfa ................. | H04W 4/14 |
| | | | 455/466 |
| 2015/0131483 A1* | 5/2015 | Colban ................ | H04W 48/20 |
| | | | 370/254 |
| 2015/0296496 A1 | 10/2015 | Cho et al. | |
| 2015/0341821 A1 | 11/2015 | Hong et al. | |
| 2015/0350961 A1* | 12/2015 | Cho .................... | H04W 48/14 |
| | | | 455/436 |
| 2016/0234726 A1* | 8/2016 | Nuggehalli ....... | H04W 36/0022 |
| 2016/0234851 A1 | 8/2016 | Zhang et al. | |
| 2016/0323919 A1 | 11/2016 | Xu et al. | |
| 2016/0345369 A1 | 11/2016 | Mestanov et al. | |
| 2017/0006523 A1* | 1/2017 | Mitsui ................ | H04W 48/18 |
| 2017/0048763 A1* | 2/2017 | Ke .................... | H04W 28/0268 |
| 2017/0164221 A1* | 6/2017 | Tan Bergstrom ..... | H04W 76/18 |
| 2018/0167814 A1* | 6/2018 | Fujishiro ............ | H04W 72/04 |
| 2018/0288815 A1* | 10/2018 | Byun .................. | H04W 92/20 |
| 2019/0014498 A1* | 1/2019 | Gao .................... | H04W 76/16 |

FOREIGN PATENT DOCUMENTS

| | | |
|---|---|---|
| WO | 2015/058336 A1 | 4/2015 |
| WO | 2015/105383 A1 | 7/2015 |
| WO | 2015/115953 A1 | 8/2015 |

OTHER PUBLICATIONS

Ericsson, "Setting Up the Xw," 3GPP TSG-RAN WG3 #87bis, R3-150740, Tenerife-Santa Cruz, Spain, Apr. 20-24, 2015, 4 pgs.
International Search Report for PCT/JP2016/004787, dated Jan. 24, 2017 (PCT/ISA/210).
Written Opinion of the International Searching Authority for PCT/JP2016/004787, dated Jan. 24, 2017 (PCT/ISA/237).
Ericsson, "BSSID List Filtering", 3GPP TSG-RAN WG #89bis, Oct. 5-9, 2015, R3-152147, total 4 pages.
Ericsson et al., "Stage 3 Details of Remaining Global XwAP Procedures", 3GPP TSG-RAN WG3 #89bis, Oct. 5-9, 2015, R3-152150, total 26 pages.
Communication dated Apr. 2, 2019 from Japanese Patent Office in counterpart JP Application No. 2018-541736.
Communication dated Oct. 8, 2019, from the Japanese Patent Office in application No. 2018-541736.
"Discussion on Architecture and Procedure of C-plane for LTE-WLAN Aggregation", CATT, 3GPP TSG RAN WG2 Meeting #91 R2-153109, Aug. 24-28, 2015, (6 pages total).
Chinese Office Action for CN Application No. 201680064826.1 dated Mar. 1, 2021 with English Translation.
3GPP TSG-RAN WG3 Meeting #89bis, R3-152252, Nokia Networks, "Text Proposal for WT Association Confirmation procedure—Stage 2 details", Oct. 9, 2015, France.
3GPP TSG RAN WG3 Meeting #89, R3-151455. CATT, "Discussion on Control Plane for Xw interface", pp. 1-6, Aug. 28, 2015, China.

\* cited by examiner

[Fig. 1]
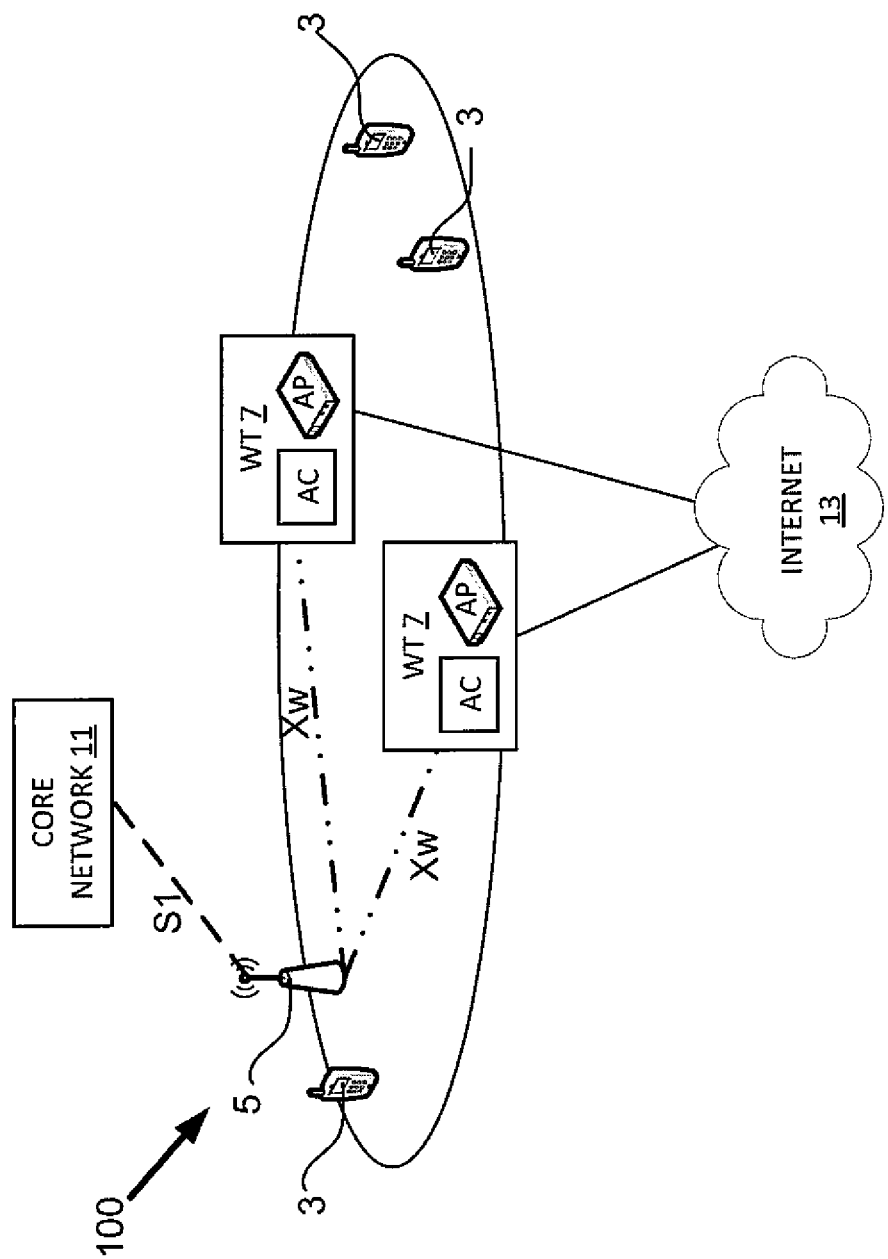

[Fig. 2]
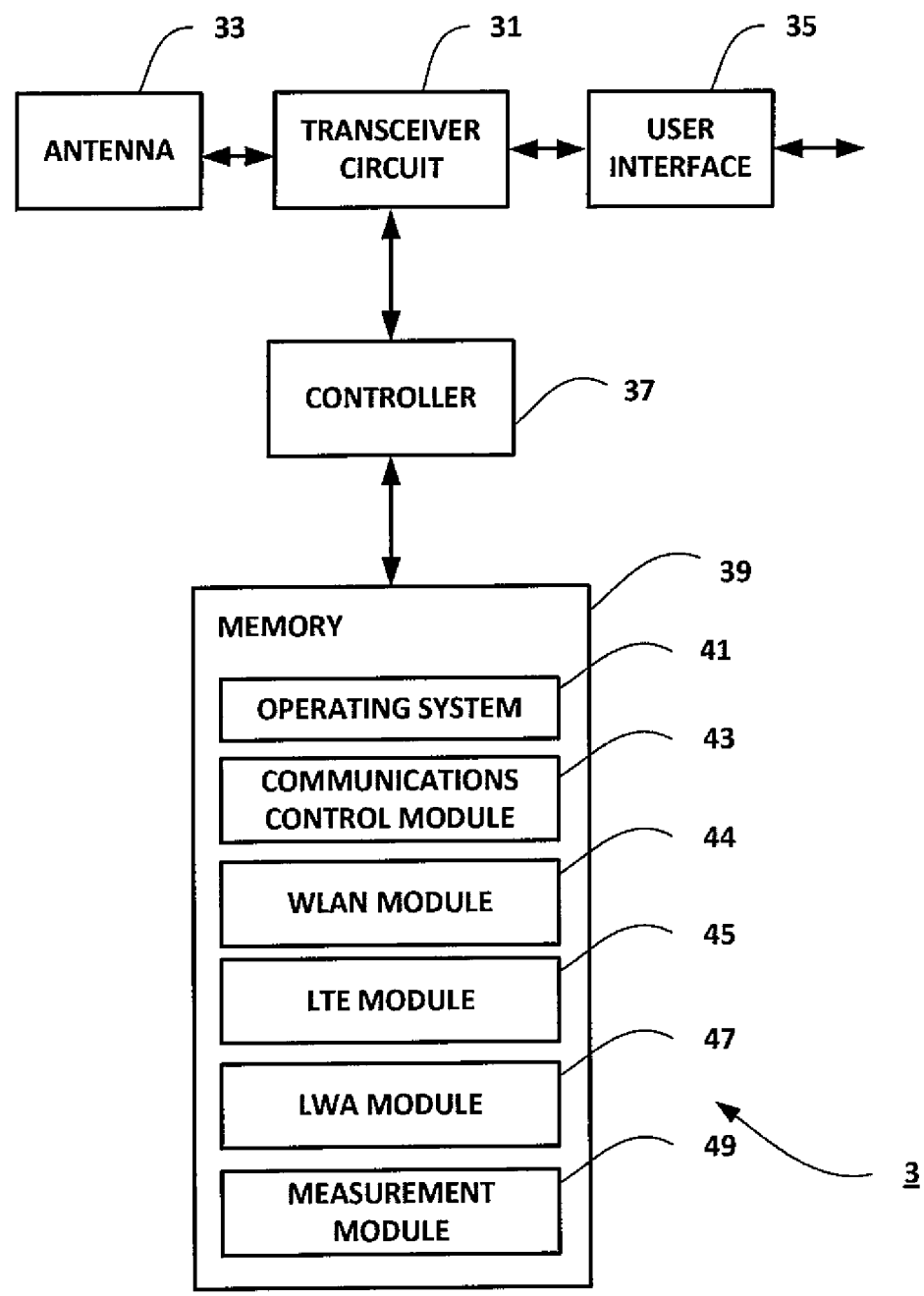

[Fig. 3]
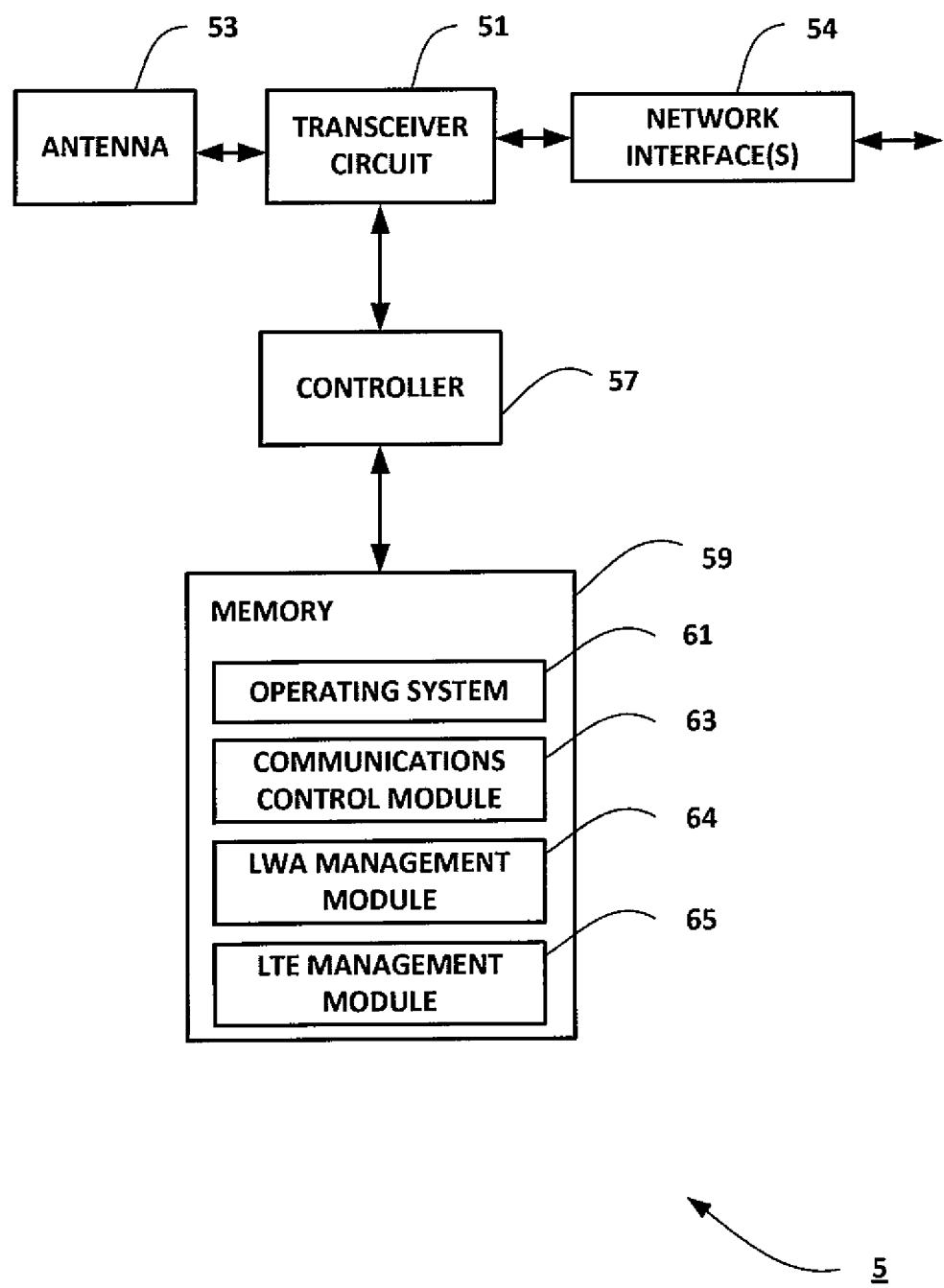

[Fig. 4]
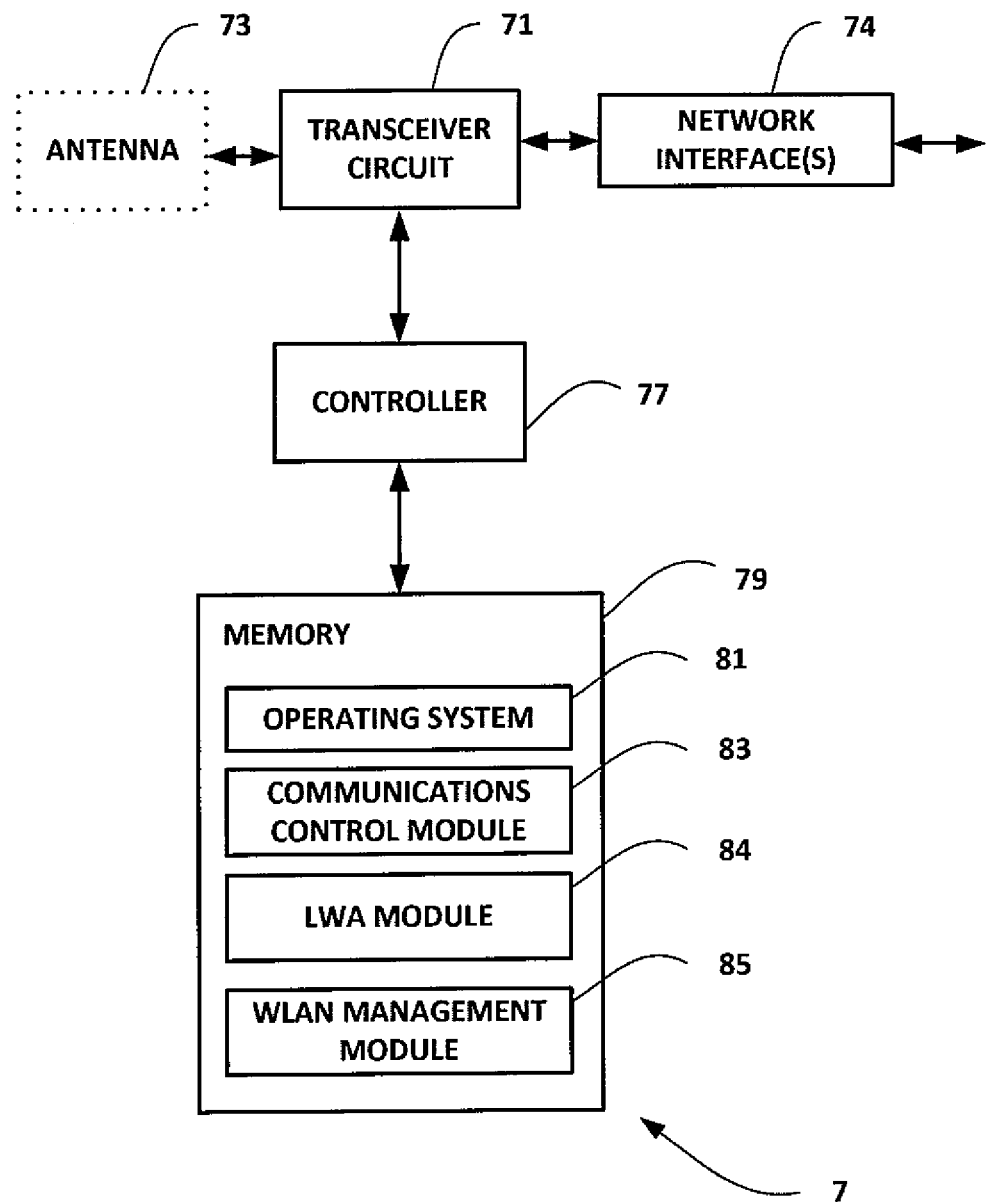

[Fig. 5]
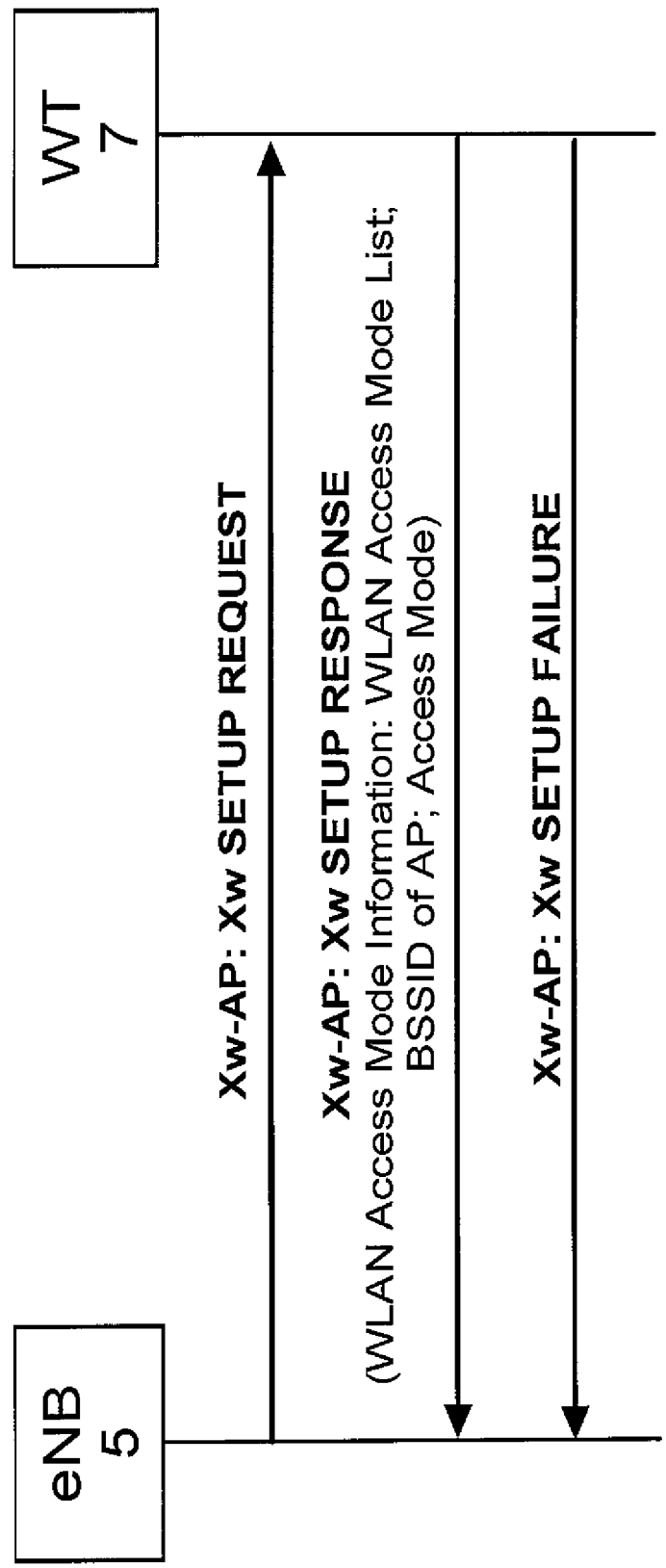

[Fig. 6]
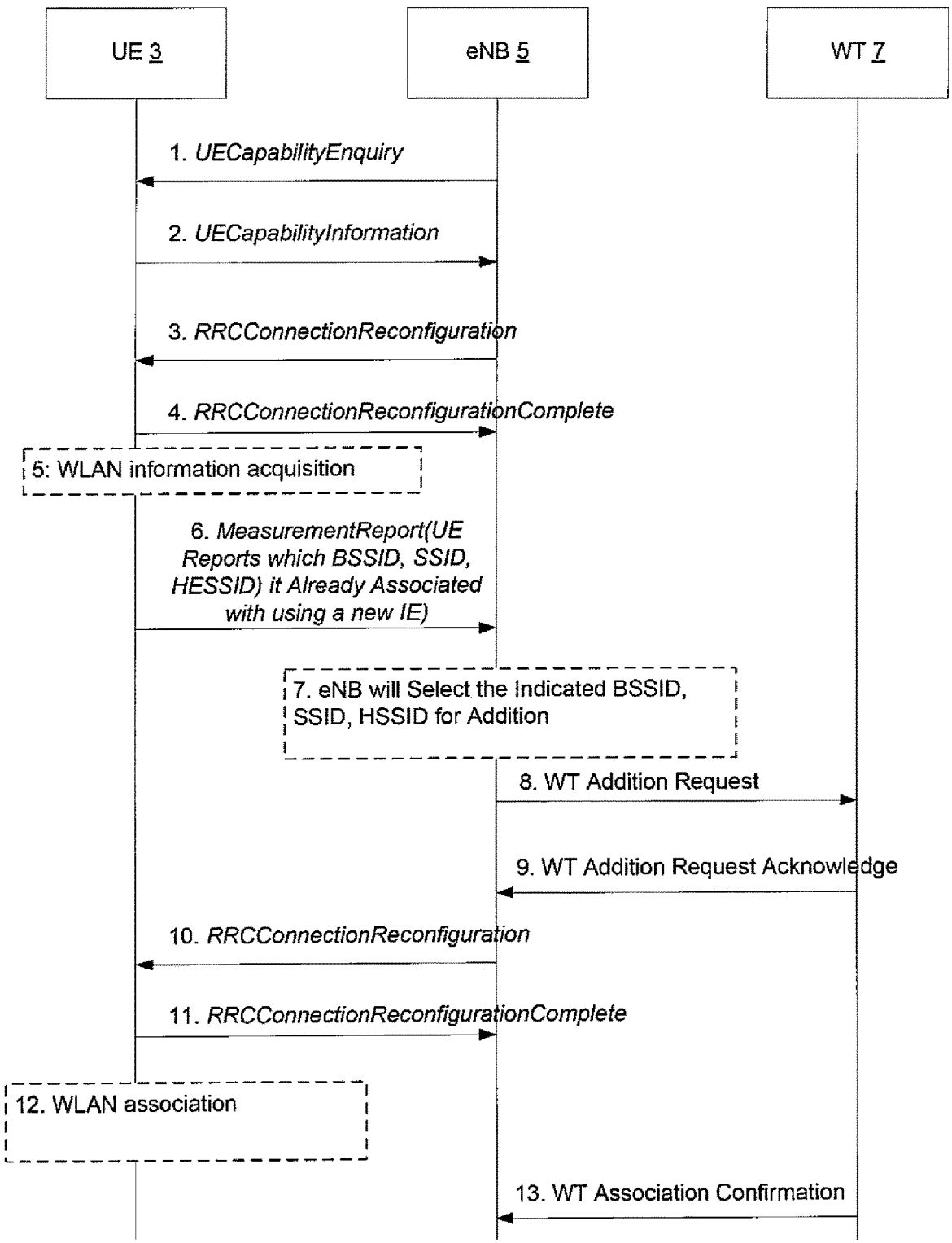

[Fig. 7]
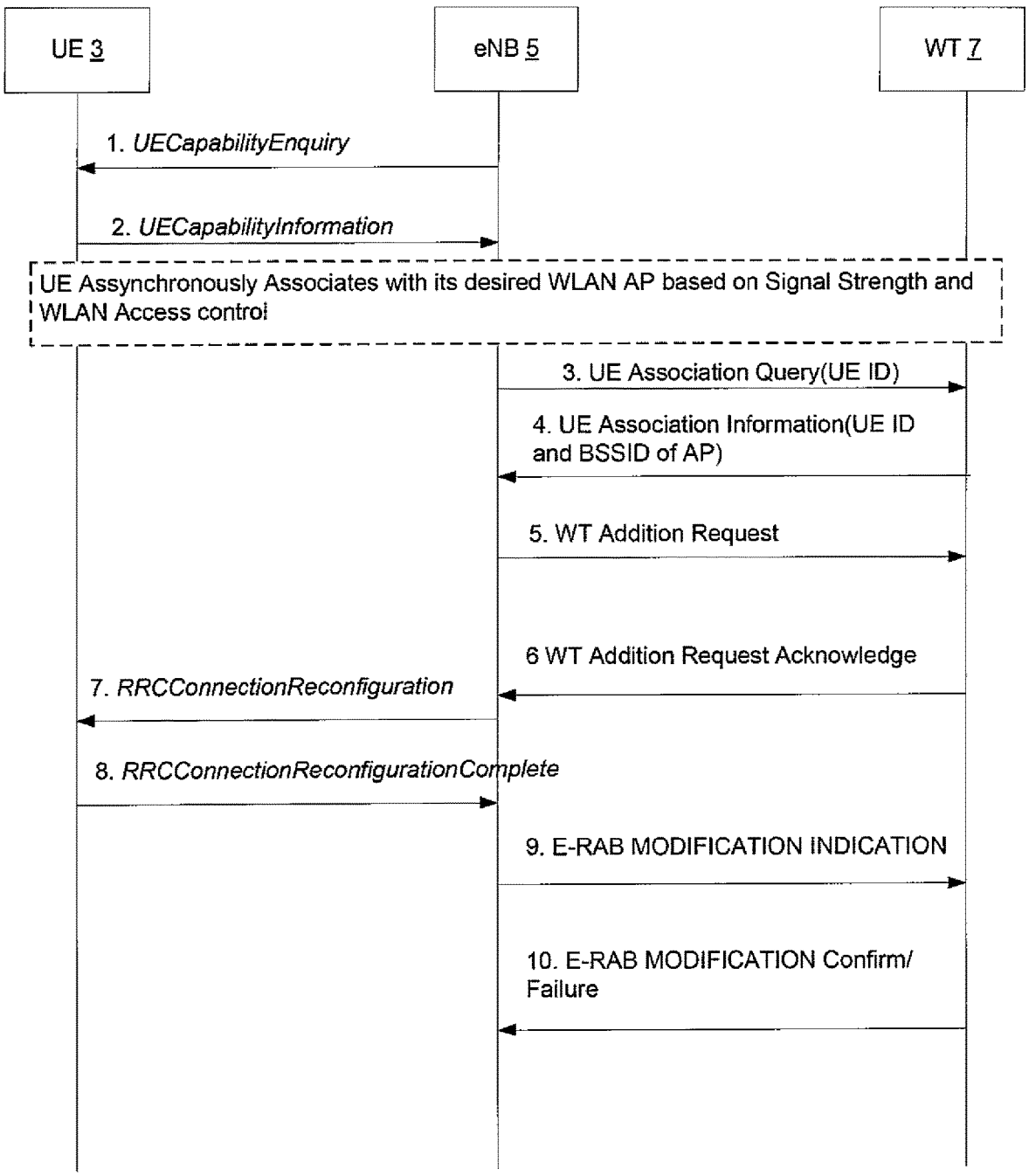

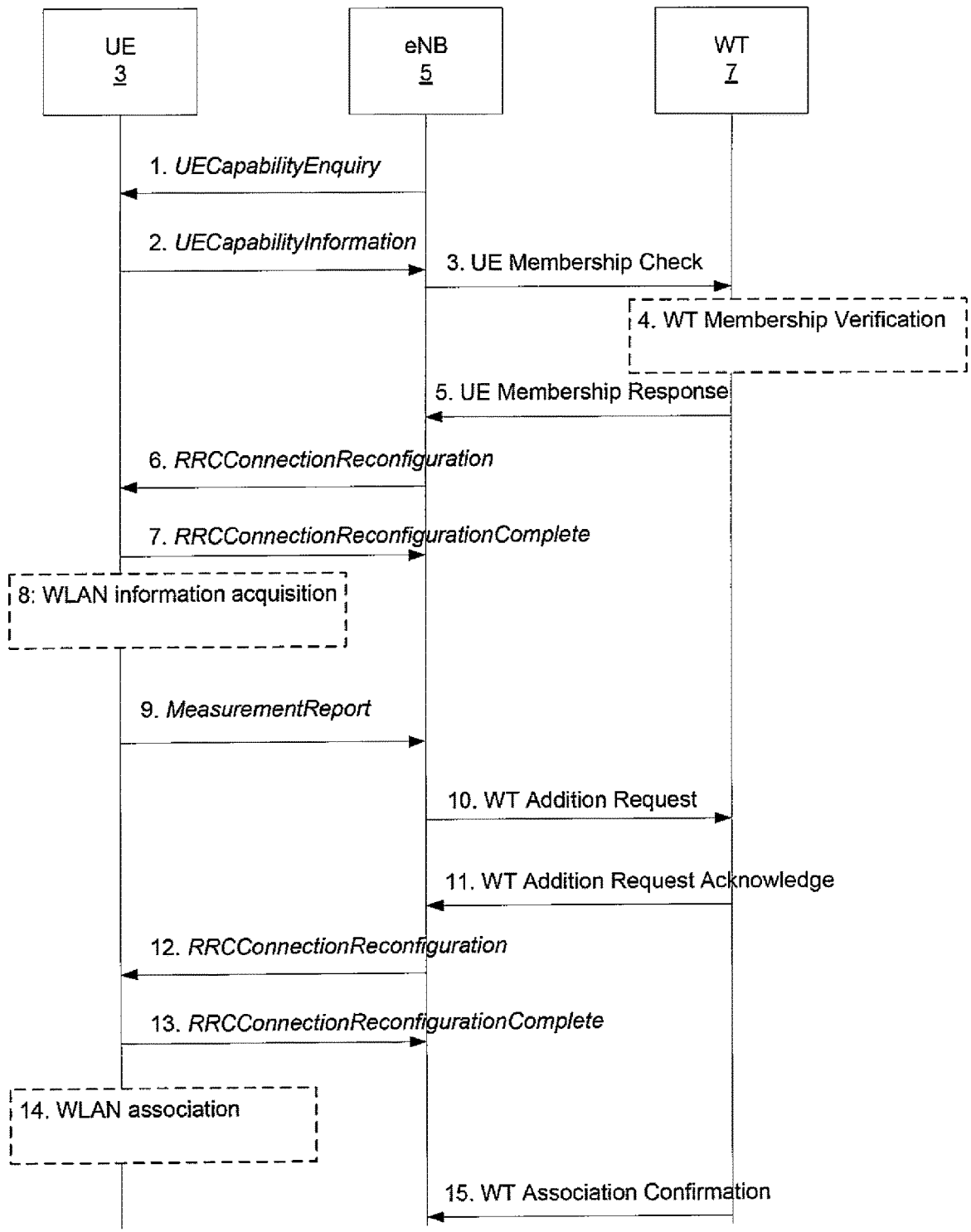
[Fig. 8]

[Fig. 9]
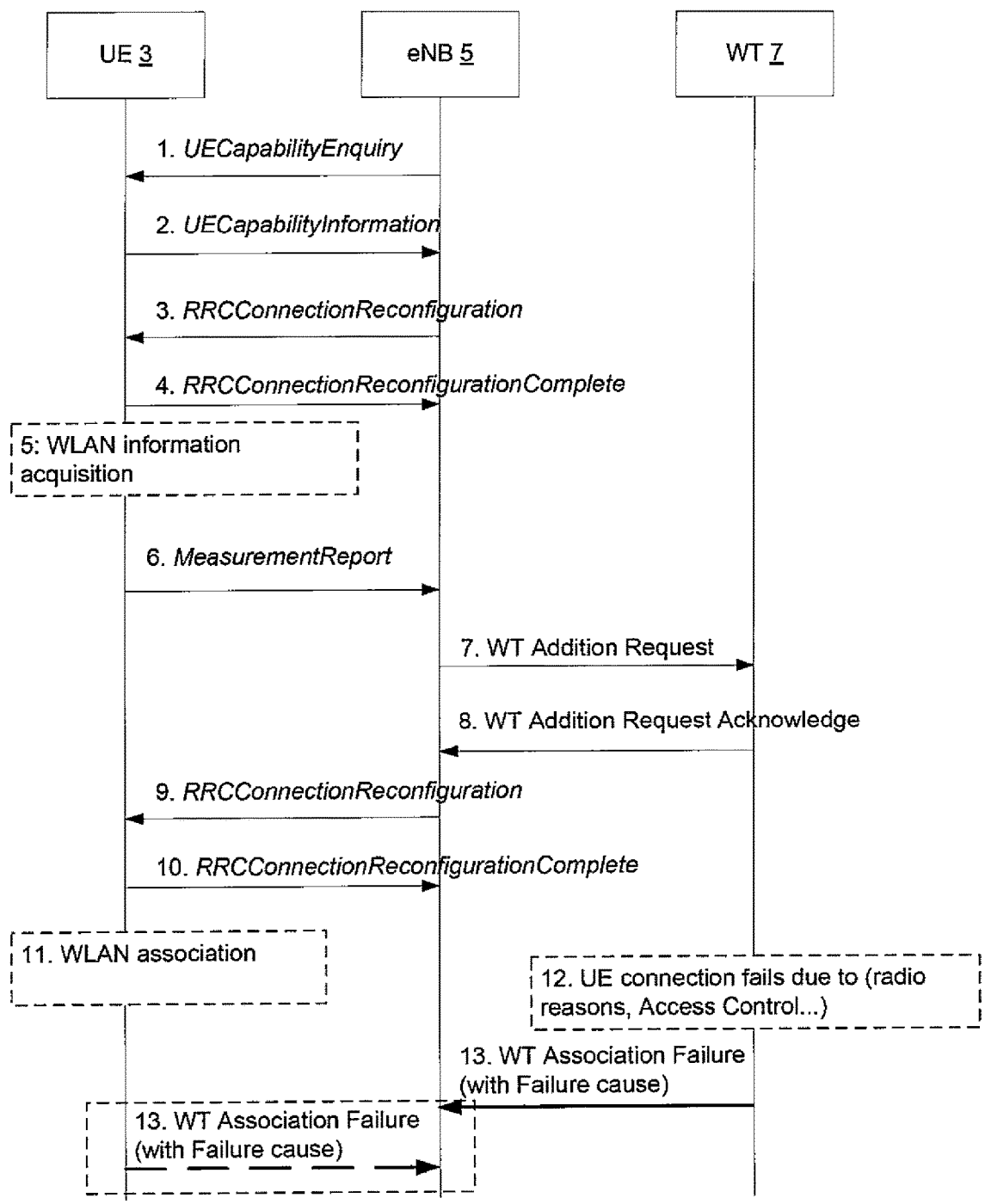

[Fig. 10]
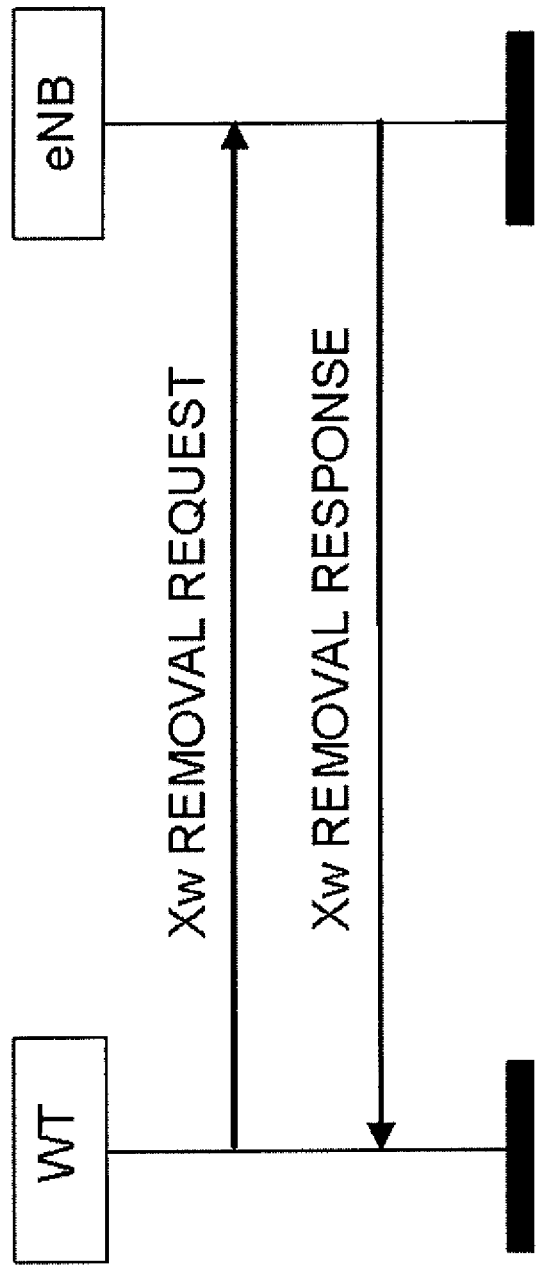

INTERFACE SETUP BETWEEN CELLULAR COMMUNICATION SYSTEM AND WLAN

CROSS REFERENCE TO RELATED APPLICATIONS

This application is a National Stage of International Application No. PCT/JP2016/004787 filed Nov. 1, 2016, claiming priority based on United Kingdom Patent Application No. 1519682.7, filed Nov. 6, 2015, the disclosures of which are incorporated herein by reference in their entireties.

TECHNICAL FIELD

The present invention relates to a communication system. The invention has particular but not exclusive relevance to wireless communication systems and devices thereof operating according to the 3rd Generation Partnership Project (3GPP) standards or equivalents or derivatives thereof, such as the Universal Terrestrial Radio Access Network (UTRAN) and the Long Term Evolution (LTE) of UTRAN (E-UTRAN), including LTE-Advanced (LTE-A). The invention also has some but not exclusive relevance to the adoption of Wireless Local Area Network (WLAN) availability into LTE/LTE-A for example by means of so-called LTE/WLAN Aggregation (LWA) and/or LTE WLAN Interworking (LWI).

BACKGROUND ART

LTE, more recently incorporating the enhancements of LTE-A, has proved to be an extremely successful platform for meeting the increasing demand for wireless broadband data capabilities. However, whilst advances in cellular technology have provided performance and capacity improvements this alone is insufficient to meet the ever increasing demand for mobile data provision with mobile data usage doubling year on year.

Accordingly, as demand increases, there continues to be an increasing need for yet further features that complement existing LTE/LTE-Advanced technology and can be used to enhance their service further. This has led to unlicensed or 'public' spectrum (typically in the 5 GHz band) being considered as a potential source of further enhancements. Whilst the benefits of communication via unlicensed spectrum cannot currently compare to those provided via a licensed regime, the efficient use of unlicensed spectrum as a complement to the use of licensed spectrum has the potential to enhance significantly the overall service provided.

The conventional method for offloading data to unlicensed spectrum has been to use Wireless Local Area Networks (WLANs). A WLAN, also referred to as Wi-Fi, is a wireless data communication network, specified by the IEEE 802.11 standards. In order to provide an architectural framework and standardisation for WLAN offloading, 3GPP has developed several solutions such as Access Network Discovery and Selection Function (ANDSF), IP flow mobility (IFOM), and S2a Mobility over GTP (SaMOG). These enable interworking with WLANs and provide data offloading through switching of data bearers to a WLAN. A relatively new proposal for LTE and WLAN interworking is so-called 'LTE/WLAN Aggregation' (LWA) in which data aggregation occurs at the Radio Access Network (RAN) where an LTE base station (also referred to as an Evolved NodeB or 'eNB') schedules packets to be served on LTE and Wi-Fi radio links. This mechanism has similarities to carrier aggregation and dual connectivity features defined in Release 10 and Release 12.

Advantages of LWA include improved control and utilisation of resources on both links with the resulting benefits that aggregated throughput can be increased for multiple users and total system capacity can be increased by virtue of improved radio resources management between users. In contrast to earlier offloading mechanisms, which rely on policies and triggers, in LWA scheduling decisions for each link can be made at a packet level based on real-time channel conditions and system utilisation. Furthermore, data aggregation at the RAN can be implemented without any changes to the core network since the WLAN radio link effectively becomes part of the E-UTRAN. 3GPP has approved a Release 13 (Rel-13) Work Item on LTE/WLAN Aggregation which is to be completed according to the Rel-13 schedule. The term 'Radio Aggregation' may be used synonymously with LWA at the RAN level. Because of radio-level aggregation (because unlike in H(e)NB case WLAN networks will be considered part of E-UTRAN with loose connection to EPC) access control and membership check has become a cumbersome process.

To facilitate LWA aggregation a new application protocol, XwAP, has been defined including based on a new logical interface, the so-called 'Xw' interface, between the eNB, and the WLAN (in fact a logical node called WLAN termination (WT) point), for the control plane and user (data) plane communication. The XwAP protocol provides the following functions: setting up the Xw; WT Configuration Update; WLAN Status Reporting; and LTE-WLAN Aggregation. The setting up the Xw function is used to exchange the necessary data for the eNB and the WT to set up the Xw interface and implicitly perform an Xw reset. The WT Configuration function allows updating of application level data needed for the eNB and the WT to interoperate correctly on the Xw interface. The WLAN Status Reporting function allows the eNB to configure reporting of load-related information from the WT. The LTE-WLAN Aggregation function allows the eNB 5 to request a WT 7 to provide radio resources for a certain mobile device while keeping responsibility for that mobile device. A number of basic procedures have also been defined as the basis for LWA and LTE/WLAN Interworking (LWI).

The logical node at which the Xw interface terminates is referred to as the WLAN Termination (WT). The logical node may form any part of the WLAN network and may, for example, be integrated into a WLAN access point (AP) and/or into a WLAN access controller (AC) serving one or more WLAN APs.

The benefits of LWA aggregation can be realised in both: co-located deployments in which the eNB and WT are provided in the same place; and non-co-located deployments in which the eNB and WT are separated from one another.

SUMMARY OF INVENTION

Technical Problem

However, the current proposals for LWA will result in a relatively inflexible system with signalling inefficiencies. For example, many (if not most) WLAN deployments work in a closed access mode in which access is restricted to items of user equipment (UEs), such as mobile telephones or other mobile (or fixed) communication devices, that are members of a particular Closed Subscriber Group (CSG). Other WLAN deployments work in a hybrid access mode in which access may be allowed for all UEs but in which members of a particular CSG are given preferential access. Under current proposals, however, even when an attempt is made to set up LWA for a UE by adding a WT of a WLAN that operates on a closed access mode, the eNB effectively assumes that the WLAN operates in an open access mode. Accordingly, there is a relatively high likelihood that the attempt will fail because the UE is not a member of a CSG associated with that WLAN. This results in wasted signalling, measurements by the UE thus draining its battery unnecessarily, and set-up time which is inefficient.

Existing LTE dual connectivity (DC) based mechanisms in which a Master eNB (MeNB) obtains CSG membership information, for a Secondary eNB (SeNB), from the core network (evolved packet core 'EPC') and then carries out CSG membership verification for the SeNB, cannot be used in LWA because there is no Link between the EPC and the WT. Moreover, according to the current status of the standardisation process, mechanisms for LWA and LWI should not require WLAN-specific core network nodes, core network interfaces or any additional core network signalling (i.e. LWA/LWI should be transparent to the EPC).

Under current proposals the eNB has total control over whether it wants to establish Xw with a particular WT. However, this can cause problems when a particular WT is (or will become) unavailable for instance due to any maintenance work.

Solution to Problem

The present invention seeks to provide a communication system and associated apparatus and methods for addressing or at least partially ameliorating the above issues.

In one aspect of the invention there is provided communication apparatus for a cellular communication system, the communication apparatus comprising: a controller and a transceiver; wherein the controller is operable to control the transceiver to communicate with communication apparatus of a wireless local area network (WLAN) in pursuance of an interface setup procedure to setup an interface between the communication apparatus for the cellular communication system and the communication apparatus of the WLAN; wherein, as part of said interface setup procedure, said controller is operable to control the transceiver to: transmit an interface setup request message to said communication apparatus of the WLAN; and receive, responsive to said interface setup request message, an interface setup response message wherein said interface setup response message comprises information identifying an access mode of at least one access point (AP) of said WLAN; and wherein said controller is operable to setup said interface at said communication apparatus for the cellular communication system based on said interface setup procedure.

In one aspect of the invention there is provided communication apparatus for a wireless local area network (WLAN), the communication apparatus comprising: a controller and a transceiver; wherein the controller is operable to control the transceiver to communicate with communication apparatus of a cellular communication system in pursuance of an interface setup procedure to setup an interface between the communication apparatus of the cellular communication system and the communication apparatus for the WLAN; wherein, as part of said interface setup procedure, said controller is operable to control the transceiver to: receive an interface setup request message from said communication apparatus of the cellular communication system; and transmit, to said communication apparatus of the cellular communication system and responsive to said interface setup request message, an interface setup response message wherein said interface setup response message comprises information identifying an access mode of at least one access point (AP) of said WLAN; and wherein said controller is operable to setup said interface at said communication apparatus for the WLAN based on said interface setup procedure.

In one aspect of the invention there is provided a communication system comprising: at least one communication apparatus for a cellular communication system according as set out above; at least one communication apparatus for a wireless local area network (WLAN) communication system as set out above; and a communication device.

In one aspect of the invention there is provided a method performed by communication apparatus of a cellular communication system, the method comprising: communicating with communication apparatus of a wireless local area network (WLAN) in pursuance of an interface setup procedure to setup an interface between the communication apparatus for the cellular communication system and the communication apparatus of the WLAN; wherein said interface setup procedure comprises: transmitting an interface setup request message to said communication apparatus of the WLAN; receiving, responsive to said interface setup request message, an interface setup response message wherein said interface setup response message comprises information identifying an access mode of at least one access point (AP) of said WLAN; and setting up said interface at said communication apparatus of the cellular communication system.

In one aspect of the invention there is provided a method performed by communication apparatus of a wireless local area network (WLAN), the method comprising: communicating with communication apparatus of a cellular communication system in pursuance of an interface setup procedure to setup an interface between the communication apparatus of the cellular communication system and the communication apparatus for the WLAN; wherein said interface setup procedure comprises: receiving an interface setup request message from said communication apparatus of the cellular communication system; transmitting, to said communication apparatus of the cellular communication system and responsive to said interface setup request message, an interface setup response message wherein said interface setup response message comprises information identifying an access mode of at least one access point (AP) of said WLAN; and setting up said interface at said communication apparatus of the WLAN.

Aspects of the invention extend to computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently (or in combination with) any other disclosed and/or illustrated features. In particular but without limitation the features of any of the claims dependent from a particular independent claim may be introduced into that independent claim in any combination or individually.

BRIEF DESCRIPTION OF DRAWINGS

FIG. 1 schematically illustrates, in simplified form, a communication network.

FIG. 2 is a block diagram illustrating, in simplified form, the main components of a mobile device for the communication network of FIG. 1.

FIG. 3 is a block diagram illustrating, in simplified form, the main components of a base station for the communication network of FIG. 1.

FIG. 4 is a block diagram illustrating, in simplified form, the main components of a WLAN termination node for the communication network of FIG. 1.

FIG. 5 illustrates, in simplified form, an Xw setup procedure that may be performed in the communication network of FIG. 1.

FIG. 6 illustrates, in simplified form, a first variation of an WT Addition procedure that may be performed in the communication network of FIG. 1.

FIG. 7 illustrates, in simplified form, a second variation of a WT Addition procedure that may be performed in the communication network of FIG. 1.

FIG. 8 illustrates, in simplified form, a third variation of a WT Addition procedure that may be performed in the communication network of FIG. 1.

FIG. 9 illustrates, in simplified form, a fourth variation of a WT Addition procedure that may be performed in the communication network of FIG. 1.

FIG. 10 illustrates, in simplified form, a WT initiated Xw removal procedure that may be performed in the communication network of FIG. 1.

DESCRIPTION OF EMBODIMENTS

<Overview>

FIG. 1 shows a mobile (cellular) communication network 100 in which mobile devices 3 (or other such user equipment) can communicate with other such devices and/or other communication entities via a E-UTRAN base station (eNB) 5, operating an associated cell, and/or via wireless local area network (WLAN) terminations (WTs) 7 each of which, in this example, comprises a single access point (AP) but may comprise a plurality of APs. Communication via the base station 5 is typically routed through a core network 11 which is accessed using an E-UTRA radio access technology (RAT). Communication via each AP of the WTs 7 is typically via an associated access controller (AC) and the internet.

As those skilled in the art will appreciate, whilst three mobile devices 3, one base station 5 and two WTs 7 are shown in FIG. 1 for illustration purposes, the system, when implemented, will typically include other base stations, WTs and mobile devices.

The eNB 5, in this example, is a low power node (LPN) such as a home base station (HNB or H(e)NB) operating a small cell but may be any form of similar base station. The eNB 5 is configured to co-ordinate with the core network 11 (e.g. a mobility management entity (MME) of the core network 11) via an associated interface (S1 interface) and the mobile devices 3 within the cell to set up radio bearers (e.g. a E-UTRAN Radio Access Bearer, 'E-RAB') for communication between the mobile devices 3 and the core network 11.

The eNB 5 supports LTE/WLAN aggregation (LWA) operation whereby a mobile device 3 in a radio resource control (RRC) connected (RRC_CONNECTED) state may be configured by the eNB 5 to utilise radio resources of both LTE and WLAN. Specifically, the eNB 5 is configured to co-ordinate with the WTs 7 and the mobile devices 3 within the cell to perform LWA and, in particular, the set up of radio bearers whose radio protocols are located in both the eNB 5 and the WT 7 and use both eNB and WLAN resources (e.g. a so called 'LWA bearer') for communication.

As part of its support for LWA, the eNB 5 is able to communicate with the WT 7 to perform a number of procedures for setting up and managing LWA. These procedures include, inter alia, an Xw setup procedure for setting up an Xw interface between the WT 7 and the eNB 5 to enable the eNB 5 to communicate with the WT 7 using a dedicated Xw application protocol (XWAP). The purpose of the Xw setup procedure is to exchange application level data needed for eNB 5 and WT 7 to interoperate correctly over the Xw interface. The Xw Setup procedure is triggered by the eNB 5. The Xw setup procedure is the first XWAP procedure which will be executed.

The procedures also include a WT addition preparation procedure to request the WT to allocate resources for LWA operation for a specific mobile device 3. The WT addition preparation procedure forms part of a wider WT addition procedure that is initiated by the eNB 5 to establish a context at the WT 7, for a specific mobile device 3, in order to provide WLAN resources to that mobile device 3.

In this example, the eNB 5, supports LWA in the non-collocated deployment scenario, and is therefore connected to the WLAN via a non-ideal backhaul in the non-collocated deployment scenario. It will be appreciated that the eNB 5 would be connected via an ideal/internal backhaul in a collocated deployment scenario.

Determining Access Mode

Advantageously, when the eNB 5 initially sends a request to setup an Xw interface to a WT 5 and the request can be successfully handled at the WT 7, the WT 7 responds with additional information about the access mode (e.g. closed, open or hybrid) of each of the APs associated with that WT 7. It will be appreciated that the WT 7 can also provide other information such as whether it is an enterprise deployment, home deployment or the like, and if so identities associated with the deployment, including closed-subscriber identities, and the type of services (e.g., UE Usage types) that the deployment handles. This allows the eNB 5 to improve its decision making when deciding whether or not to offload mobile device communication to a particular AP. The eNB 5 may, for example, select an open or hybrid access AP in preference to a closed access AP.

Determining Mobile Device Access to a Specific AP

Whilst simply knowing the access mode of the APs is advantageous in its own right, in a further enhancement, the eNB 5 is also beneficially able to obtain information that indicates that a particular mobile device 3 is able to successfully access a particular AP (group of APs or WLAN service set as represented by a service set identifier, 'SSID' or Homogenous Extended Service Set ID, 'HESSID') even when that AP operates in closed access mode.

In one example of the communication network of FIG. 1, this is achieved by the mobile device 3 providing the eNB 5 with information identifying one or more APs that it is able to successfully access (or has currently associated with or was successfully associated with in the past). In this example, this information identifying the AP(s) comprises at least one new information element (IE) that may be inserted into a measurement report generated by the mobile device 3, as part of the WT addition procedure. It will be appreciated, however, that in a variation on this the information identifying the AP(s) may comprise at least one new information element (IE) that may be inserted into UE capability information that is sent by the mobile device 3, to the eNB 5, ahead of WT Addition. It will be appreciated that the provisioning of this information by a mobile device 3 can be part of a WT Addition procedure or a different procedure that can provide the information for use at the time executing WT Addition.

Based on UE provided membership status information, an eNB can consider adding an identified WT while indicating the UE provided membership status as a new IE in the WT Addition message. WT can subsequently perform membership verification and acknowledge either positively OR negatively depending on the outcome of its membership check.

The identified AP(s) may comprise an AP that the mobile device 3 has previously associated with successfully and/or may comprise an AP that the mobile device 3 knows it is allowed to access based on its CSG membership and/or it is successfully associated with. The eNB 5 can then use the obtained information to select an identified AP (or an identifier associated with that AP such as a basic service set identifier, 'BSSID', SSID, HESSID) for use in the WT addition preparation procedure.

This information identifying the access point may be in any suitable form but will typically comprise a basic service set identifier (BSSID), service set identifier (SSID), and/or Homogenous Extended Service Set ID (HESSID). The BSSID is the media access control (MAC) address of the wireless access point generated by combining a 24 bit Organization Unique Identifier (the manufacturer's identity) and the manufacturer's assigned 24-bit identifier for the radio chipset in the AP. The BSSID is the formal name of a basic service set 'BSS' and is always associated with a single BSS. The SSID is an informal name for the BSS. The HESSID is a MAC address which is the same for all APs belonging to a particular network.

In another example of the communication network of FIG. 1, the eNB 5 obtains the information that indicates that a particular mobile device 3 is able to successfully access a particular AP directly from the WT 7. For example following a successful autonomous association between that mobile device 3 and the AP the eNB 5 the WT 7 can inform the eNB 5 whether or not a particular mobile device 3 is connected to (or associated with) the WT 7 and, if so, the BSSID of the AP that the mobile device 3 in question is connected to (or associated with). Beneficially, whilst the WT 7 may inform the eNB 5 in different respective messages for each mobile device 3, the WT 7 may use a collective message to inform the eNB 7 of the status of a plurality of mobile devices 3.

In a variation on this example of the communication network of FIG. 1, the WT 7 beneficially informs the eNB 5 of one or more AP(s) that a particular mobile device 3 may access in response to a query message from the eNB 5 that identifies that mobile device 3 (e.g. by means of a UE ID such as an international mobile subscriber identity, 'IMSI', or UE MAC Address). Where the mobile device 3 in question has previously (or currently) successfully associated with an AP of that WT 7, the WT 7 can respond to such a query message with the BSSID/SSID/HESSID of an AP that the mobile device 3 has previously (or currently) associated with. Where a mobile device 3 has not made a connection with any AP of the WT 7, the WT can respond with information identifying whether the mobile device 3 is allowed in its domain (e.g. by virtue of its membership of a particular CSG) and, if so the identity of at least one AP (e.g. BSSID, SSID or HESSID) the mobile device 3 in question is allowed to access. Accordingly, based on this information from the WT 7, the eNB 5 is able to come to an improved decision on whether or not to perform WT addition for the mobile device 3 in question, with that WT 7. Where WT Addition is considered possible for a given mobile device 3, an eNB 5 can then request specific WLAN bearer configuration and the WT 7 can respond either positively or negatively to this request.

In another variation in which the eNB 5 obtains the information that indicates that a particular mobile device 3 is able to successfully access a particular AP from the WT 7, the eNB 5 performs a UE membership check procedure with a WT 7 to establish the membership status for a particular mobile device 3 for APs of that WT 7. Advantageously, this UE membership check is performed before the eNB 5 communicates with the mobile device 3 to configure the mobile device 3 to perform related WLAN measurements. The UE membership check involves the eNB 5 sending a UE membership check message to the WT 7 for a specific mobile device 3 (e.g. as identified by a UE ID) and the WT 7 performing a membership verification responsive to receipt of the UE membership check message and generating and sending a UE membership response message to the eNB 5 which carries information identifying at least one AP (e.g. a BSSID, SSID or HESSID) that the mobile device 3 in question is allowed to access. The eNB 5 can therefore configure the mobile device 3 in question to perform WLAN measurements based on knowledge of the AP(s) that the mobile device 3 in question are allowed to access. This timely shortlisting can greatly save power and can result in more efficient use of scarce radio spectrum as otherwise a mobile device 3 has to measure numerous WLAN APs.

In another beneficial example of the communication network of FIG. 1, the eNB 5 obtains the information that indicates that a particular mobile device 3 is able to successfully access a particular AP based on previous failed (and/or successful) attempts to perform the WT addition procedure. In this variation, when a WT addition procedure fails when a mobile device attempts to associate with a particular WT AP, the affected WT 7 is beneficially able to inform the eNB 5 not only of the failure but of the cause of the failure (e.g. radio reasons, failed access control, and or the like). Based on the information identifying the cause of the failure, the eNB 5 can therefore avoid attempting to use APs for the communication of a particular mobile device 3 when such an attempt has previously been unsuccessful because of an access control failure. It will be appreciated that, rather than (or as well as) the AP providing notification of the failure together with a cause of the failure, the mobile device 3 may provide this information. This information can help the eNB 5 configure appropriate UE-Specific mobility-set enlisting only those BSSID, SSID OR HESSID that a mobile device 3 is allowed to access.

WT LWA Control

The WT 7 of the communication network of FIG. 1 is also beneficially provided with enhanced capability to control aspects of LWA. Specifically, The WT 7 is provided with a new procedure for triggering removal of an Xw interface (e.g. in the event that the WT is overloaded as a result of its own traffic, or in the event that its APs are not available for maintenance reasons). This is particularly advantageous because it means that the eNB 5 is less likely to try to offload its own LTE traffic to WLANs that are unavailable for maintenance reasons or in which communication is overloaded.

<Mobile Device>

FIG. 2 is a block diagram illustrating the main components of a mobile device 3 as shown in FIG. 1. As shown, the mobile device 3 has a transceiver circuit 31 that is operable to transmit signals to and to receive signals from an eNB 5 (or WT AP) via one or more antenna 33. The mobile device 3 has a controller 37 to control the operation of the mobile device 3. The controller 37 is associated with a memory 39 and is coupled to the transceiver circuit 31. Although not necessarily shown in FIG. 2, the mobile device 3 will of course have all the usual functionality of a conventional mobile device 3 (such as a user interface 35) and this may be provided by any one or any combination of hardware, software and firmware, as appropriate. Software may be pre-installed in the memory 39 and/or may be downloaded via the telecommunication network or from a removable data storage device (RMD), for example.

The controller 37 controls overall operation of the mobile device 3 by, in this example, program instructions or software instructions stored within memory 39. As shown, these software instructions include, among other things, an operating system 41, a communications control module 43, a WLAN module 44, an LTE module 45, an LWA module 47, and a measurement module 49.

The communications control module 43 controls the overall communication between the mobile device 3 and the base station 5 and between the mobile device 3 and the APs of the WT 7. Subsidiary to the main communications control module 43 the WLAN module 44 manages WLAN user communication to and from the AP of the WT and the LTE module 45 manages LTE user communication to and from the eNB 5.

The LWA module 45 is responsible for the handling of LWA related control messages received from and sent to the eNB 5 in pursuit of LWA related procedures such as the WT addition procedure.

The measurement module 49 manages measurements of the signals of proximate (e.g. neighbouring) eNBs and/or WT APs, when configured to do so by the eNB 5, and the generation and transmission of related measurement reports.

<Base Station>

FIG. 3 is a block diagram illustrating the main components of a eNB 5 as shown in FIG. 1. As shown, the eNB 5 has a transceiver circuit 51 for transmitting signals via one or more antenna 53 to and from the mobile devices 3, and via at least one (but typically a plurality) of network interfaces 54 to and from other network entities such as, for example, other cell operating apparatus (e.g. a base station via an X2 interface), core network entities (e.g. a mobility management entity via an S1 interface) and WTs 7 (e.g. via an Xw interface). The eNB 5 has a controller 57 to control the operation of eNB 5. The controller 57 is associated with a memory 59. Although not necessarily shown in FIG. 3, the eNB 5 will of course have all the usual functionality of a cellular telephone network eNB 5 and this may be provided by any one or any combination of hardware, software and firmware, as appropriate. Software may be pre-installed in the memory 59 and/or may be downloaded via the communication network or from a removable data storage device (RMD), for example.

The controller 57 is configured to control the overall operation of the eNB 5 by, in this example, program instructions or software instructions stored within memory 59. As shown, these software instructions include, among other things, an operating system 61, a communications control module 63, an LWA management module 64 and an LTE management module 65.

The communications control module 63 controls the overall communication between the eNB 5 and the mobile device 3 and between the eNB 5 and the WT 7. Subsidiary to the main communications control module 63 the LTE management module 65 manages LTE related communication to and from the mobile device 3 and to and from the core network.

The LWA management module 64 is responsible for the handling of LWA related control messages received from and sent to the mobile device 3 and WT 7 in pursuit of LWA related procedures such as the WT addition and setup procedures.

<WT>

FIG. 4 is a block diagram illustrating the main components of a WT node 7 as shown in FIG. 1.

As shown, the WT 7 has a transceiver circuit 71 for transmitting signals via at least one (but typically a plurality) of network interfaces 74 to and from other network entities such as, for example, the eNB 5 (e.g. via an Xw interface). The WT7 has a controller 77 to control the operation of WT 7. The controller 77 is associated with a memory 79. Although not necessarily shown in FIG. 3, the WT 7 will of course have all the usual functionality of WT 7 and this may be provided by any one or any combination of hardware, software and firmware, as appropriate. Software may be pre-installed in the memory 79 and/or may be downloaded via the communication network or from a removable data storage device (RMD), for example. Where the WT 7 and its AP(s) form part of a single co-located apparatus, the WT 7 may also comprise one or more antenna 73 via which signals can be transmitted to and from the mobile devices 3 using Wi-Fi communication protocols.

The controller 77 is configured to control the overall operation of the WT 7 by, in this example, program instructions or software instructions stored within memory 79. As shown, these software instructions include, among other things, an operating system 81, a communications control module 83, an LWA module 84 and an WLAN module 65.

The communications control module 83 controls the overall communication between the WT 7 and the eNB 5 and between the WT 7 and other communication devices such as mobile devices 7 (where the WT includes at least one integrated AP), AP(s) and/or access control nodes (where they do not form part of the WT 7). Subsidiary to the main communications control module 83 the WLAN management module 85 manages WLAN related communication to and from such other communication devices.

The LWA module 84 is responsible for the handling of LWA related control messages received from and sent to the eNB 7 in pursuit of LWA related procedures such as the WT addition and setup procedures.

<Xw Setup Procedure>

FIG. 5 illustrates, in simplified form, an Xw setup procedure that may be performed between the eNB 5 and WT 7 in the communication network of FIG. 1.

The purpose of the Xw Setup procedure is to exchange application level data needed for eNB and WT to interoperate correctly over the Xw interface. The Xw Setup procedure is triggered by the eNB. The Xw Setup procedure is the first XWAP procedure which will be executed.

As seen in FIG. 5, the Xw setup procedure starts with a setup request message (e.g. an Xw-AP: Xw SETUP REQUEST) being sent from the eNB 5 to the WT 7. When the request can be accommodated successfully, the WT 7 responds with an appropriate response message (e.g. an Xw-AP: Xw SETUP RESPONSE) which, in this example, includes WLAN access mode information (e.g. closed, hybrid or open) for each AP of that WT. The access mode information is provided as a WLAN access mode list including a BSSID of each AP in association with its respective access mode. The contents of an exemplary response message (or at least part of such a message) is illustrate, in simplified form, below in Table 1.

TABLE 1

| IE/Group Name | Presence | Range | IE type and reference | Semantics description | Criticality | Assigned Criticality |
|---|---|---|---|---|---|---|
| Message Type | M | | Z.2.1 | | YES | reject |
| WT ID | M | | Z.2.6 | | YES | reject |
| WLAN Identifier List | | 1 | | List of identifiers supported by the WT | YES | reject |
| >WLAN Identifier Item | | 1 ... <maxnoofBSSsperWT> | | | | |
| >>WLAN Information | M | | Z.2.7 | | | |
| Criticality Diagnostics | O | | Z.2.5 | | YES | ignore |
| WLAN Access Mode Information | O | | Z.2.6 | | YES | ignore |
| >WLAN Access Mode List | | 0 ... <maxnoofAPwithWT> | | | GLOBAL | reject |
| >>BSSID of AP | | 1 ... | z.2.7 | | | |
| >>Access Mode | | | | | | | contents of an exemplary XWAP response message (Xw SETUP RESPONSE)

As seen in FIG. 5, when the request cannot be accommodated successfully, the WT 7 responds with an appropriate failure message (e.g. an Xw-AP: Xw SETUP FAILURE).

It will be appreciated that the WT 7 can also provide, in the Xw SETUP RESPONSE, further information such as: whether the WLAN deployment is an enterprise deployment, a home deployment; and information identifying any special service types (analogous to UE Usage types) that it supports.

<WT Addition Procedure—Variation 1>

FIG. 6 illustrates, in simplified form, a first variation of a WT Addition procedure that may be performed between the mobile device 3, eNB 5 and WT 7 in the communication network of FIG. 1.

In the procedure of FIG. 6, the eNB 5 and WT 7 perform the following steps:

1. The eNB 5 requests a transfer of mobile device radio access capabilities for LWA from the mobile device 3. In this example, the message comprises a 'UECapabilityEnquiry' message.

2. The mobile device 3 reports LWA capability, including supported WLAN bands. In this example, the report is sent using a 'UECapabilityInformation' message.

It will be appreciated that Step 1 and 2 may not be repeated for every WT Addition if the eNB 5 and mobile device 3 have performed these before.

3. The eNB 5 configures the UE WLAN measurements by sending an appropriate configuration message (e.g. an RRC-ConnectionReconfiguration message).

4. The mobile device 3 applies the measurement configuration and replies with an appropriate acknowledgement (e.g. an RRCConnectionReconfigurationComplete message) that the requested measurement configuration has been completed.

5. The mobile device 3 acquires WLAN information based on the measurement configuration received in step 3 (and setup in step 4).

6. The mobile device 3 generates and sends the corresponding measurement report to the eNB 5.

The measurement report generated by the mobile device 3 includes information identifying the AP(s) that the mobile device 3 has previously (or currently) associated with successfully. It will be appreciated that the measurement report may alternatively (or additionally) comprise information identifying AP(s) that the mobile device 3 knows it is allowed to access based on its CSG membership. This information identifying the access point may be in any suitable form but will typically comprise a basic service set identifier (BSSID), service set identifier (SSID), and/or Homogenous Extended Service Set ID (HESSID).

The measurement comprises at least one new information element (IE) for accommodating this information element.

As foreshadowed in the overview, however, it will be appreciated that in a variation on using the measurement report in this way the information identifying the AP(s) may comprise at least one new information element (IE) that may be inserted into UE capability information that is sent by the mobile device 3, to the eNB 5, in step 2 above.

7. The eNB 5 uses the information obtained in the measurement report to select an identified AP (where a mobile device 3 in question is allowed access based on the information provided by the mobile device 3) for use in the WT addition preparation procedure that follows.

8. The eNB 5 decides to send, to the WT 7, a request message to request the preparation of resources for LTE-WLAN aggregation for a specific mobile device, (e.g. a WT Addition Request). This requests the appropriate WT 7 to allocate, for the selected AP, WLAN resources for specific E-RABs.

This may optionally enable an eNB 5 to indicate the mobile device reported membership status to a WT 7, for the WT 7 to carry out a UE Membership Verification process that may be specific to the WLAN. This optional step is not needed when a mobile device 3 indicates using its measurement report that it has already successfully associated with an appropriate AP that is connected to a given WT 7.

Typically, the WT Addition Request message includes information identifying the LWA bearer(s) for a specific mobile device.

9. If the WT 7 is able to admit the full or partial WLAN resource request, it responds with an acknowledgement message (e.g. a WT Request Addition Acknowledge) subject to a successful membership verification if that is requested in Step 8.

Typically, when one or more GPRS Tunnelling Protocol (GTP) tunnel(s) have been established successfully at the WT 7, the WT responds with WT Addition Request Acknowledge message, which includes successfully established and bearers that failed to be established for LWA.

Typically, when WT addition is not successful, the WT would respond with WT addition request reject message (not shown) instead.

10. The eNB 5 sends a message to the mobile device 3 including a new radio resource configuration for the mobile device 3 to use in configuring its connections via the eNB and/or WT 7 (e.g. using an RRCConnectionReconfiguration message).

11. The mobile device 3 applies the new configuration and replies with an appropriate message to indicate successful setup of the new configuration (e.g. RRCConnectionReconfigurationComplete message).

12. The mobile device 3 then performs WLAN Association with the selected AP if it has not associated with the WLAN already.

13. Once the mobile device 3 has performed successful WLAN Association with the selected AP, the WT 7 sends a WT Association Confirmation message to confirm this. In case a mobile device 3 in question has already been associated with an AP, the WT 7 will respond using another appropriate message type (e.g., WT Association complete).

<WT Addition Procedure—Variation 2>

FIG. 7 illustrates, in simplified form, a second variation of a WT Addition procedure that may be performed between the mobile device 3, eNB 5 and WT 7 in the communication network of FIG. 1.

In the procedure of FIG. 7, the eNB 5 and WT 7 perform the following steps:

1. The eNB 5 requests a transfer of mobile device radio access capabilities for LWA from the mobile device 3. In this example, the message comprises a 'UECapabilityEnquiry' message.

2. The mobile device 3 reports LWA capability, including supported WLAN bands. In this example, the report is sent using a 'UECapabilityInformation' message.

It will be appreciated that Step 1 and 2 may not be repeated for every WT Addition if the eNB 5 and mobile device 3 have performed these before.

In this example, independently of the WT procedure, the mobile device 3 asynchronously associates with its desired WLAN AP, for example based on signal strength and WLAN access control.

3. The eNB 5 sends a query message (e.g. a UE Association Query) to the WT 7 that identifies that mobile device 3 (e.g. by means of a UE ID such as an international mobile subscriber identity, 'IMSI', or UE MAC Address). The query message is, in effect, a message requesting information identifying AP(s) with which the mobile device has previously (or is currently) associated with (or AP(s) that the mobile device is allowed to access by virtue of CSG information.

4. Where the mobile device 3 in question has previously or currently successfully associated with an AP of that WT 7, the WT 7 responds to such a query message with the BSSID of at least one AP that the mobile device 3 has previously associated with. The response may comprise a UE Association Response message comprising both the BSSID and the UE ID of the mobile device 3 in question.

Where a mobile device 3 has not made a connection with any AP of the WT 7, the WT can respond with information identifying whether the mobile device 3 is allowed in its domain (e.g. by virtue of its membership of a particular CSG) and, if so the identity of at least one AP (e.g. BSSID, SSID or HESSID) the mobile device 3 in question is allowed to access. Accordingly, based on this information from the WT 7, the eNB 5 is able to come to an improved decision on whether or not to perform WT addition for the mobile device 3 in question, with that WT 7.

The eNB 5 uses the information obtained in the response message to select an identified AP for use in the WT addition preparation procedure that follows.

5. The eNB 5 decides to send, to the WT 7, a request message to request the preparation of resources for LTE-WLAN aggregation for a specific mobile device, (e.g. a WT Addition Request). This requests the appropriate WT 7 to allocate, for the selected AP, WLAN resources for specific E-RABs.

Typically, the WT Addition Request message includes information identifying the LWA bearer(s) for a specific mobile device.

6. If the WT 7 is able to admit the full or partial WLAN resource request, it responds with an acknowledgement message (e.g. a WT Addition Request Acknowledge).

Typically, when one or more GPRS Tunnelling Protocol (GTP) tunnel(s) have been established successfully at the WT 7, the WT responds with WT Addition Request Acknowledge message, which includes successfully established and bearers that failed to be established for LWA.

Typically, when WT addition is not successful, the WT would respond with WT addition request reject message (not shown) instead.

7. The eNB 5 sends a message to the mobile device 3 including a new radio resource configuration for the mobile device 3 to use in configuring its connections via the eNB and/or WT 7 (e.g. using an RRCConnectionReconfiguration message).

8. The mobile device 3 applies the new configuration and replies with an appropriate message to indicate successful setup of the new configuration (e.g. RRCConnectionReconfigurationComplete message).

9. The eNB 5 then requests the WT to setup a specific WLAN bearer configuration by means of E-UTRAN a radio access bearer (E-RAB) modification indication.

10. The WT 7 responds either positively (e.g. using an E-RAB modification confirm) or negatively (e.g. using an E-RAB modification failure) to this request.

It will be appreciated that any appropriate messages type can be used in steps 9 and 10.

<WT Addition Procedure—Variation 3>

FIG. 8 illustrates, in simplified form, a third variation of a WT Addition procedure that may be performed between the mobile device 3, eNB 5 and WT 7 in the communication network of FIG. 1.

In the procedure of FIG. 8, the eNB 5 and WT 7 perform the following steps:

1. The eNB 5 requests a transfer of mobile device radio access capabilities for LWA from the mobile device 3. In this example, the message comprises a 'UECapabilityEnquiry' message.

2. The mobile device 3 reports LWA capability, including supported WLAN bands. In this example, the report is sent using a 'UECapabilityInformation' message.

It will be appreciated that Step 1 and 2 may not be repeated for every WT Addition if the eNB 5 and mobile device 3 have performed these before.

3. The eNB 5 sends a UE membership check message to the WT 7 for a specific mobile device 3 (e.g. as identified by a UE ID). The UE membership check message is, in effect, a message requesting the WT to perform a membership verification procedure for the identified mobile device 3.

4. The WT 7 performs an access control and/or membership verification responsive to receipt of the UE membership check message.

5. The WT 7 generates and sends a UE membership response message, to the eNB 5, which carries information identifying at least one AP (e.g. a BSSID, SSID or HESSID) that the mobile device 3 in question is allowed to access.

The eNB 5 can therefore configure the mobile device 3 in question to perform WLAN measurements based on knowledge of the AP(s) that the mobile device 3 in question are allowed to access.

6. The eNB 5 configures the UE WLAN measurements by sending an appropriate configuration message (e.g. an RRC-ConnectionReconfiguration message).

7. The mobile device 3 applies the measurement configuration and replies with an appropriate acknowledgement (e.g. an RRCConnectionReconfigurationComplete message) that the requested measurement configuration has been completed.

8. The mobile device 3 acquires WLAN information based on the measurement configuration received in step 6 (and setup in step 7).

9. The mobile device 3 generates and sends the corresponding measurement report to the eNB 5.

10. The eNB 5 decides to send, to the WT 7, a request message to request the preparation of resources for LTE-WLAN aggregation for a specific mobile device, (e.g. a WT Addition Request). This requests the appropriate WT 7 to allocate, for the selected AP, WLAN resources for specific E-RABs.

Typically, the WT Addition Request message includes information identifying the LWA bearer(s) for a specific mobile device.

11. If the WT 7 is able to admit the full or partial WLAN resource request, it responds with an acknowledgement message (e.g. a WT Addition Request Acknowledge).

Typically, when one or more GPRS Tunnelling Protocol (GTP) tunnel(s) have been established successfully at the WT 7, the WT responds with WT Addition Request Acknowledge message, which includes successfully established and bearers that failed to be established for LWA.

Typically, when WT addition is not successful, the WT would respond with WT addition request reject message (not shown) instead.

12. The eNB 5 sends a message to the mobile device 3 including a new radio resource configuration for the mobile device 3 to use in configuring its connections via the eNB and/or WT 7 (e.g. using an RRCConnectionReconfiguration message).

13. The mobile device 3 applies the new configuration and replies with an appropriate message to indicate successful setup of the new configuration (e.g. RRCConnectionReconfigurationComplete message).

14. The mobile device 3 then performs WLAN Association with the selected AP.

15. Once the mobile device 3 has performed successful WLAN Association with the selected AP, the WT 7 sends a WT Association Confirmation message to confirm this.

<WT Addition Procedure—Variation 4>

FIG. 9 illustrates, in simplified form, a fourth variation of a WT Addition procedure that may be performed between the mobile device 3, eNB 5 and WT 7 in the communication network of FIG. 1.

In the procedure of FIG. 9, the mobile device 3, eNB 5 and WT 7 perform the following steps:

1. The eNB 5 requests a transfer of mobile device radio access capabilities for LWA from the mobile device 3. In this example, the message comprises a 'UECapabilityEnquiry' message.

2. The mobile device 3 reports LWA capability, including supported WLAN bands. In this example, the report is sent using a 'UECapabilityInformation' message.

It will be appreciated that Step 1 and 2 may not be repeated for every WT Addition if the eNB 5 and mobile device 3 have performed these before.

3. The eNB 5 configures the UE WLAN measurements by sending an appropriate configuration message (e.g. an RRC-ConnectionReconfiguration message).

4. The mobile device 3 applies the measurement configuration and replies with an appropriate acknowledgement (e.g. an RRCConnectionReconfigurationComplete message) that the requested measurement configuration has been completed.

5. The mobile device 3 acquires WLAN information based on the measurement configuration received in step 3 (and setup in step 4).

6. The mobile device 3 generates and sends the corresponding measurement report to the eNB 5.

7. The eNB 5 decides to send, to the WT 7, a request message to request the preparation of resources for LTE-WLAN aggregation for a specific mobile device, (e.g. a WT Addition Request). This requests the appropriate WT 7 to allocate, for the selected AP, WLAN resources for specific E-RABs.

Typically, the WT Addition Request message includes information identifying the LWA bearer(s) for a specific mobile device.

8. If the WT 7 is able to admit the full or partial WLAN resource request, it responds with an acknowledgement message (e.g. a WT Addition Request Acknowledge).

Typically, when one or more GPRS Tunnelling Protocol (GTP) tunnel(s) have been established successfully at the WT 7, the WT responds with WT Addition Request Acknowledge message, which includes successfully established and bearers that failed to be established for LWA.

Typically, when WT addition is not successful, the WT would respond with WT addition request reject message (not shown) instead.

9. The eNB 5 sends a message to the mobile device 3 including a new radio resource configuration for the mobile device 3 to use in configuring its connections via the eNB and/or WT 7 (e.g. using an RRCConnectionReconfiguration message).

10. The mobile device 3 applies the new configuration and replies with an appropriate message to indicate successful setup of the new configuration (e.g. RRCConnectionReconfigurationComplete message).

11. The mobile device 3 then attempts to perform WLAN Association with the selected AP.

12. If the mobile device 3 association attempts fails the WT determines the cause of the failure (e.g. radio reasons, access control preventing association, and or the like).

13. The affected WT 7 informs the eNB 5 not only of the failure but of the cause of the failure (e.g. radio reasons, failed access control, and or the like), for example using a failure indication message (e.g. a WT Association Failure (with failure cause)).

Based on the information identifying the cause of the failure, the eNB 5 can therefore avoid attempting to use APs for the communication of a particular mobile device 3 when such an attempt has previously been unsuccessful because of an access control failure.

Otherwise if the mobile device 3 has performed successful WLAN Association with the selected AP (e.g. as in variation 1) the WT 7 sends a WT Association Confirmation message to confirm this.

As foreshadowed in the overview, at step 13, rather than the AP providing notification of the failure together with a cause of the failure, the mobile device 3 may provide this information as indicated in the dashed box and by the dashed arrow.

<WT Initiated Xw Removal>

FIG. 10 illustrates, in simplified form, a WT initiated Xw removal procedure that may be performed between the eNB 5 and WT 7 in the communication network of FIG. 1.

As seen in FIG. 10 the WT 7, when a WT 7 wishes an Xw interface to be removed (e.g. because the WLAN of the WT is unavailable for maintenance reasons or is overloaded) the WT 7 can trigger removal of the Xw by sending an associated request for triggering removal of the interface (e.g. Xw Removal Request to the eNB). The eNB 5 responds with a response message to indicate success (or possibly failure) of the request (e.g Xw Removal Response message).

It will be appreciated that the request for removal may comprise a removal cause to indicate the cause of the request (e.g. maintenance, overload etc.)

It will be appreciated that an eNB can equally trigger Xw Removal when needed.

<Benefits, Modifications and Alternatives>

Detailed embodiments have been described above. As those skilled in the art will appreciate, a number of modifications and alternatives can be made to the above embodiments whilst still benefiting from the inventions embodied therein. By way of illustration only a number of these alternatives and modifications will now be described.

In the above embodiments, the mobile devices are cellular telephones. It will be appreciated that the above embodiments could be implemented using devices other than mobile telephones such as, for example, personal digital assistants, laptop computers, web browsers, etc. The above embodiments are applicable to non-mobile or generally stationary user equipment as well.

It will be appreciated that a benefit of the above embodiments is that no new WLAN-related core network signalling is needed, thus reducing core network load.

It will be appreciated that unlike the way access control works in the case of conventional H(e)NB where CSG subscription data is operations, administration and management (OAM) configured and kept at a home subscriber servers (HSS) or visitor Location Register (VLR), the UE-WLAN subscription is not available to the HSS/VLR. In a variation on the above examples, however, subscription data can be be supplied by WT to the eNB, and from the eNB to the EPC for use by the HSS/VLR. In this example, a new Xw procedure may be provided for the WT to pass information identifying mobile devices that are allowed to access each of the WT's APs (BSSID, SSID or HSSID). In this way the HSS/VLR can beneficially carry out Membership Verification for mobile devices in a similar manner as currently performed for the H(e)NB case.

In the above embodiments, a number of software modules were described. As those skilled in the art will appreciate, the software modules may be provided in compiled or un-compiled form and may be supplied to the mobile device, eNB or WT as a signal over a computer network, or on a recording medium. Further, the functionality performed by part or all of this software may be performed using one or more dedicated hardware circuits.

In a particularly beneficial example, there is provided communication apparatus for a cellular communication system, the communication apparatus comprising: a controller and a transceiver; wherein the controller is operable to control the transceiver to communicate with communication apparatus of a wireless local area network (WLAN) in pursuance of an interface setup procedure to setup an interface between the communication apparatus for the cellular communication system and the communication apparatus of the WLAN; wherein, as part of said interface setup procedure, said controller is operable to control the transceiver to: transmit an interface setup request message to said communication apparatus of the WLAN; and receive, responsive to said interface setup request message, an interface setup response message wherein said interface setup response message comprises information identifying an access mode of at least one access point (AP) of said WLAN; and wherein said controller is operable to setup said interface at said communication apparatus for the cellular communication system based on said interface setup procedure.

The controller may be operable to control the transceiver to communicate with said communication apparatus of the wireless local area network (WLAN) in pursuance of a procedure (e.g. a WLAN termination, 'WT', addition procedure) to establish a context for a communication device, served by said communication apparatus for said cellular communication system, at said communication apparatus of said WLAN.

As part of said procedure to establish a context for a communication device, said controller may be operable to control the transceiver to receive information identifying at least one access point that said communication device is able to access.

The controller may be operable to control the transceiver to receive said information identifying at least one access point that said communication device is able to access from the communication device.

The controller may be operable to control the transceiver to receive said information identifying at least one access point that said communication device is able to access, from the communication device, in at least one of: a measurement report; a message providing information identifying at least one capability of the communication device (e.g. a UE capability information message); and a dedicated message for providing information indicating an association between the communication device and at least one AP (e.g. a UE association message).

The controller may be operable to control the transceiver to receive said information identifying at least one access point that said communication device is able to access from the communication apparatus of the WLAN.

The controller may be operable to control the transceiver to receive said information identifying at least one access point that said communication device is able to access, from the communication apparatus of the WLAN, in a dedicated message for providing information indicating an association between the communication device and at least one AP (e.g. a UE association information message).

The controller may be operable to control the transceiver to transmit, to said communication apparatus of the WLAN, a dedicated message for requesting information indicating an association between the communication device and at least one AP(e.g. a UE association query message); and said dedicated message for providing information indicating an association between the communication device and at least one AP may be provided by said communication apparatus of the WLAN responsive to said message for requesting information indicating an association between the communication device and at least one AP.

The controller may be operable to control the transceiver to: transmit, to said communication apparatus of the WLAN, a message requesting a membership check be performed, for the communication device, by the communication apparatus of the WLAN (e.g. a UE membership check message); and receive, from said communication apparatus of the WLAN, said information identifying at least one access point that said communication device is able to access in a message (e.g. a UE membership response message) sent responsive to said message requesting a membership check be performed.

As part of said procedure to establish a context for a communication device, said controller may be operable to control the transceiver to receive, from at least one of said communication device and said communication apparatus of the WLAN, a message indicating that said communication device is not able to access at least one access point.

The message indicating that the communication device is not able to access at least one access point may comprise a message indicating that there has been a failure to associate said communication device with an access point of said WLAN (e.g. a WT association failure message) with a failure cause set to indicate that access control has prevented said association.

The controller may be operable to control the transceiver to communicate with said communication apparatus of a wireless local area network (WLAN) in pursuance of a WLAN triggered procedure to remove said interface.

As part of said WLAN triggered procedure to remove said interface, said controller may be operable to control the transceiver to: receive an interface removal request message from said communication apparatus of the WLAN; and transmit, responsive to said interface removal request message, an interface removal response message to said communication apparatus of the WLAN; and the controller may be operable to remove said interface at said communication apparatus for the cellular communication system based on said WLAN triggered procedure to remove said interface.

The interface removal response message may include a cause for said removal.

In a particularly beneficial example, there is provided communication apparatus for a wireless local area network (WLAN), the communication apparatus comprising: a controller and a transceiver; wherein the controller is operable to control the transceiver to communicate with communication apparatus of a cellular communication system in pursuance of an interface setup procedure to setup an interface between the communication apparatus of the cellular communication system and the communication apparatus for the WLAN; wherein, as part of said interface setup procedure, said controller is operable to control the transceiver to: receive an interface setup request message from said communication apparatus of the cellular communication system; and transmit, to said communication apparatus of the cellular communication system and responsive to said interface setup request message, an interface setup response message wherein said interface setup response message comprises information identifying an access mode of at least one access point (AP) of said WLAN; and wherein said controller is operable to setup said interface at said communication apparatus for the WLAN based on said interface setup procedure.

In a particularly beneficial example, there is provided a communication system comprising: at least one communication apparatus for a cellular communication system according as set out above; at least one communication apparatus for a wireless local area network (WLAN) communication system as set out above; and a communication device.

In a particularly beneficial example, there is provided a method performed by communication apparatus of a cellular communication system, the method comprising: communicating with communication apparatus of a wireless local area network (WLAN) in pursuance of an interface setup procedure to setup an interface between the communication apparatus for the cellular communication system and the communication apparatus of the WLAN; wherein said interface setup procedure comprises: transmitting an interface setup request message to said communication apparatus of the WLAN; receiving, responsive to said interface setup request message, an interface setup response message wherein said interface setup response message comprises information identifying an access mode of at least one access point (AP) of said WLAN; and setting up said interface at said communication apparatus of the cellular communication system.

In a particularly beneficial example, there is provided a method performed by communication apparatus of a wireless local area network (WLAN), the method comprising: communicating with communication apparatus of a cellular communication system in pursuance of an interface setup procedure to setup an interface between the communication apparatus of the cellular communication system and the communication apparatus for the WLAN; wherein said interface setup procedure comprises: receiving an interface setup request message from said communication apparatus of the cellular communication system; transmitting, to said communication apparatus of the cellular communication system and responsive to said interface setup request message, an interface setup response message wherein said interface setup response message comprises information identifying an access mode of at least one access point (AP) of said WLAN; and setting up said interface at said communication apparatus of the WLAN.

In a particularly beneficial example, there is provided communication apparatus for a cellular communication system, the communication apparatus comprising: a controller and a transceiver; wherein said controller is operable to control the transceiver to communicate with communication apparatus of a wireless local area network (WLAN) in pursuance of a procedure (e.g. a WLAN termination, 'WT', addition procedure) to establish a context for a communication device, served by said communication apparatus for said cellular communication system, at said communication apparatus of said WLAN; and wherein, as part of said procedure to establish a context for a communication device, said controller is operable to control the transceiver to receive information identifying at least one access point that said communication device is able to access.

In another particularly beneficial example, there is provided communication apparatus for a cellular communication system, the communication apparatus comprising: a controller and a transceiver; wherein said controller is operable to control the transceiver to communicate with said communication apparatus of a wireless local area network (WLAN) in pursuance of a WLAN triggered procedure to remove said interface; and wherein, as part of said WLAN triggered procedure to remove said interface, said controller is operable to control the transceiver to: receive an interface removal request message from said communication apparatus of the WLAN; and transmit, responsive to said interface removal request message, an interface removal response message to said communication apparatus of the WLAN; and wherein said controller is operable to remove said interface at said communication apparatus for the cellular communication system based on said WLAN triggered procedure to remove said interface.

In another particularly beneficial example, there is provided a communication device for a cellular communication system, the communication device comprising: a controller and a transceiver; wherein said controller is operable to control the transceiver to communicate with communication apparatus of a cellular communication system in pursuance of a procedure (e.g. a WLAN termination, 'WT', addition procedure) to establish a context for the communication device at communication apparatus of a wireless local area network (WLAN); wherein, as part of said procedure to establish a context for the communication device, said controller is operable to control the transceiver to provide information identifying at least one access point that said communication device is able to access in at least one of: a measurement report; a message providing information identifying at least one capability of the communication device (e.g. a UE capability information message); and a dedicated message for providing information indicating an association between the communication device and at least one AP (e.g. a UE association message).

In another particularly beneficial example, there is provided a communication device for a cellular communication system, the communication device comprising: a controller and a transceiver; wherein said controller is operable to control the transceiver to communicate with communication apparatus of a cellular communication system in pursuance of a procedure (e.g. a WLAN termination, 'WT', addition procedure) to establish a context for the communication device at communication apparatus of a wireless local area network (WLAN); said controller is operable to control the transceiver to transmit, to the communication apparatus of the cellular communication system, a message indicating that said communication device is not able to access at least one access point.

Various other modifications will be apparent to those skilled in the art and will not be described in further detail here.

This application is based upon and claims the benefit of priority from United Kingdom patent application No. 1519682.7, filed on Nov. 6, 2015, the disclosure of which is incorporated herein in its entirety by reference.

The invention claimed is:

1. A communication apparatus for a cellular communication system, the communication apparatus comprising:
a transceiver circuit;
a memory storing software; and
a controller configured to execute the software and thereby:
control the transceiver circuit to communicate with a communication apparatus of a wireless local area network (WLAN);
control the transceiver circuit to transmit an interface setup request message to the communication apparatus of the WLAN;
control the transceiver circuit to receive, responsive to the interface setup request message, an interface setup response message,
wherein the interface setup response message comprises:
information on whether at least one access point (AP) of the WLAN operates in an open mode, a closed mode, or a hybrid mode; and
an identifier of the at least one AP of the WLAN, and
wherein the open mode is a mode in which access is allowed for all communication devices, the closed mode is a mode in which access is restricted to communication devices that are members of a particular group, and the hybrid mode is a mode in which access is allowed for all communication devices but in which members of the particular group are given preferential access; and
select an AP which operates in the open mode or the hybrid mode in preference to an AP which operates in the closed mode based on the information;
request the communication apparatus of the WLAN to allocate a WLAN resource for the selected AP; and
setup an interface, at the communication apparatus for the cellular communication system with the communication apparatus of the WLAN, using the interface setup response message.

2. The communication apparatus as claimed in claim 1, wherein the controller is further configured to control the transceiver circuit to communicate with the communication apparatus of the WLAN to establish a context for a communication device, served by the communication apparatus for the cellular communication system, at the communication apparatus of the WLAN.

3. The communication apparatus as claimed in claim 2, wherein the controller is further configured to control the transceiver circuit to receive information identifying at least one access point that the communication device is able to access from the communication device.

4. The communication apparatus as claimed in claim 3, wherein the controller is further configured to control the transceiver circuit to receive the information identifying the at least one access point that the communication device is able to access, from the communication device, in at least one of:
a measurement report;
a message providing information identifying at least one capability of the communication device; and
a dedicated message for providing information indicating an association between the communication device and the at least one AP.

5. The communication apparatus as claimed in claim 2, wherein the controller is further configured to control the transceiver circuit to receive the information identifying the at least one access point that the communication device is able to access, from the communication apparatus of the WLAN, in a dedicated message providing information indicating an association between the communication device and the at least one AP.

6. The communication apparatus as claimed in claim 5, wherein the controller is further configured to control the transceiver circuit to transmit, to the communication apparatus of the WLAN, a dedicated message requesting the information indicating an association between the communication device and the at least one AP; and
wherein the dedicated message providing information indicating the association between the communication device and the at least one AP is provided by the communication apparatus of the WLAN responsive to the message requesting the information indicating the association between the communication device and the at least one AP.

7. The communication apparatus as claimed in claim 2, wherein the controller is further configured to control the transceiver circuit to receive, from at least one of the communication device and the communication apparatus of the WLAN, a message indicating that the communication device is not able to access at least one access point.

8. The communication apparatus as claimed in claim 7, wherein the message indicating that the communication device is not able to access at least one access point comprises a message indicating that there has been a failure to associate the communication device with an access point of the WLAN with a failure cause set to indicate that access control has prevented the association.

9. The communication apparatus as claimed in claim 1, wherein the controller is further configured to control the transceiver circuit to communicate with the communication apparatus of the WLAN in pursuance of a WLAN triggered procedure to remove the interface.

10. The communication apparatus as claimed in claim 9, wherein the controller is further configured to control the transceiver circuit to:
receive an interface removal request message from the communication apparatus of the WLAN; and
transmit, responsive to the interface removal request message, an interface removal response message to the communication apparatus of the WLAN, and
wherein the controller is operable to remove the interface at the communication apparatus for the cellular communication system using the WLAN triggered procedure to remove the interface.

11. The communication apparatus as claimed in claim 10, wherein the interface removal response message includes a cause for the removal.

12. A communication system comprising:
a cellular communication apparatus for a cellular communication system;
a wireless local area network (WLAN) communication apparatus for a WLAN communication system; and
a communication device,
wherein the cellular communication apparatus is configured to transmit an interface setup request message to the WLAN communication apparatus,
wherein the WLAN communication apparatus is configured to receive the interface setup request message and, responsive to the interface setup request message, transmit, to the cellular communication apparatus, an interface setup response message comprising information on whether at least one access point (AP) of the WLAN operates in an open mode, a closed mode, or a hybrid mode and an identifier of the at least one AP of the WLAN,
wherein the open mode is a mode in which access is allowed for all communication devices, the closed mode is a mode in which access is restricted to communication devices that are members of a particular group, and the hybrid mode is a mode in which access is allowed for all communication devices but in which members of the particular group are given preferential access,
wherein the cellular communication apparatus is configured to select an AP which operates in the open mode or the hybrid mode in preference to an AP which operates in the closed mode based on the information, and to request the communication apparatus of the WLAN to allocate a WLAN resource for the selected AP; and
wherein the cellular communication apparatus and the WLAN communication apparatus are further configured to setup an interface between the cellular communication apparatus and the WLAN communication apparatus using the interface setup request message and the interface setup response message.

13. A method performed by a communication apparatus of a cellular communication system, the method comprising:
communicating with a communication apparatus of a wireless local area network (WLAN) and thereby performing an interface setup procedure comprising:
transmitting an interface setup request message to the communication apparatus of the WLAN;
receiving, responsive to the interface setup request message, an interface setup response message,
wherein the interface setup response message comprises:
information on whether at least one access point (AP) of the WLAN operates in an open mode, a closed mode, or a hybrid mode; and
an identifier of the at least one AP of the WLAN, and
wherein the open mode is a mode in which access is allowed for all communication devices, the closed mode is a mode in which access is restricted to communication devices that are members of a particular group, and the hybrid mode is a mode in which access is allowed for all communication devices but in which members of the particular group are given preferential access; and
selecting an AP which operates in the open mode or the hybrid mode in preference to an AP which operates in the closed mode based on the information;
requesting the communication apparatus of the WLAN to allocate a WLAN resource for the selected AP; and
setting up an interface between the communication apparatus of the WLAN and the communication apparatus of the cellular communication system using the interface setup response message.

14. A non-transitory computer readable medium storing a computer program comprising instructions for causing a computer-programmable device of a communication apparatus of a cellular communication system to perform a method comprising:
communicating with a communication apparatus of a wireless local area network (WLAN) and thereby performing an interface setup procedure comprising:
transmitting an interface setup request message to the communication apparatus of the WLAN;
receiving, responsive to the interface setup request message, an interface setup response message,
wherein the interface setup response message comprises:
information on whether at least one access point (AP) of the WLAN operates in an open mode, a closed mode, or a hybrid mode; and
an identifier of the at least one AP of the WLAN, and
wherein the open mode is a mode in which access is allowed for all communication devices, the closed mode is a mode in which access is restricted to communication devices that are members of a particular group, and the hybrid mode is a mode in which access is allowed for all communication devices but in which members of the particular group are given preferential access; and selecting an AP which operates in the open mode or the hybrid mode in preference to an AP which operates in the closed mode based on the information;

requesting the communication apparatus of the WLAN to allocate a WLAN resource for the selected AP; and setting up an interface between the communication apparatus of the WLAN and the communication apparatus of the cellular communication system using the interface setup response message.

\* \* \* \* \*